US011116241B2

(12) United States Patent
Benavente Vega

(10) Patent No.: US 11,116,241 B2
(45) Date of Patent: Sep. 14, 2021

(54) METHOD FOR PREPARATION OF A PROTEIN SUPPLEMENT FOR ANIMAL FEED

(71) Applicant: PESQUERA PACIFIC STAR S.A., Puerto Montt (CL)

(72) Inventor: Luis Alberto Benavente Vega, Puerto Montt (CL)

(73) Assignee: PESQUERA PACIFIC STAR S.A., Puerto Montt (CL)

( * ) Notice: Subject to any disclaimer, the term of this patent is extended or adjusted under 35 U.S.C. 154(b) by 479 days.

(21) Appl. No.: 15/305,217

(22) PCT Filed: Dec. 17, 2014

(86) PCT No.: PCT/IB2014/067026
§ 371 (c)(1),
(2) Date: Oct. 19, 2016

(87) PCT Pub. No.: WO2015/162467
PCT Pub. Date: Oct. 29, 2015

(65) Prior Publication Data
US 2017/0042186 A1  Feb. 16, 2017

(30) Foreign Application Priority Data

Apr. 24, 2014  (CL) .................................. 1051-2014

(51) Int. Cl.
| | | |
|---|---|---|
| *A23K 10/22* | (2016.01) | |
| *A23J 1/04* | (2006.01) | |
| *A23L 17/00* | (2016.01) | |
| *A23K 30/00* | (2016.01) | |
| *A23K 30/20* | (2016.01) | |

(52) U.S. Cl.
CPC .................. *A23K 10/22* (2016.05); *A23J 1/04* (2013.01); *A23K 30/00* (2016.05); *A23K 30/20* (2016.05); *A23L 17/00* (2016.08)

(58) Field of Classification Search
CPC ........ A23K 10/22; A23K 30/00; A23K 20/20; A23L 17/00; A23J 1/04
USPC .............................. 426/2, 541, 641, 643, 443
See application file for complete search history.

(56) References Cited

U.S. PATENT DOCUMENTS 4,288,458 A   9/1981 Barnes

FOREIGN PATENT DOCUMENTS

| GB | 1596758 A | 8/1981 |
|---|---|---|
| JP | 10295284 | * 11/1998 |
| WO | 87/04051 A1 | 7/1987 |
| WO | 00/53033 A1 | 9/2000 |
| WO | 2008046993 A2 | 4/2008 |

OTHER PUBLICATIONS

JP 10295284, Nov. 1998, translation.*
International Search Report dated Apr. 16, 2015 for PCT/IB2014/067026 and English translation.
Written Opinion dated Apr. 16, 2015 for PCT/IB2014/067026 and English translation.

* cited by examiner

*Primary Examiner* — Leslie A Wong
(74) *Attorney, Agent, or Firm* — Lucas & Mercanti, LLP

(57) ABSTRACT

Method for improving drying of a concentrated acid salmon silage, during preparation of a protein supplement for animal feed, from salmon silage, wherein in a continuous and sequential form includes treating the stored salmon silage through steps of cooking, separation, concentration, drying, grinding, addition of antioxidant, and packing, wherein after the concentration step, the following steps proceed:

a) incorporating in a first mixer an amount of concentrated acid salmon silage, and an amount of flour-type carrier, obtaining an homogeneous mixture;

b) incorporating in a second mixer an additional amount of concentrated acid salmon silage, an amount from the first mixer, and a fraction of the load coming out of the dryer, the latter as a recycle;

c) transferring the mixture formed in the second mixer to a dryer;

d) recycling a fraction of the load, equivalent to the amount that can be from 30% to 60% of the output of the second mixer, fraction defined in function of the humidity at the exit of the dryer;

e) passing the mixture of the dry product at the exit of the dryer to a cooler, wherein the cooling is performed from 80° C. to 25° C. for 10 to 30 minutes;

f) feeding the dry and cooled down product to the steps of grinding, adding an antioxidant, and packing of the protein supplement for animal feed.

Also disclosed are the protein supplement and system to improve drying said protein feed.

8 Claims, 1 Drawing Sheet

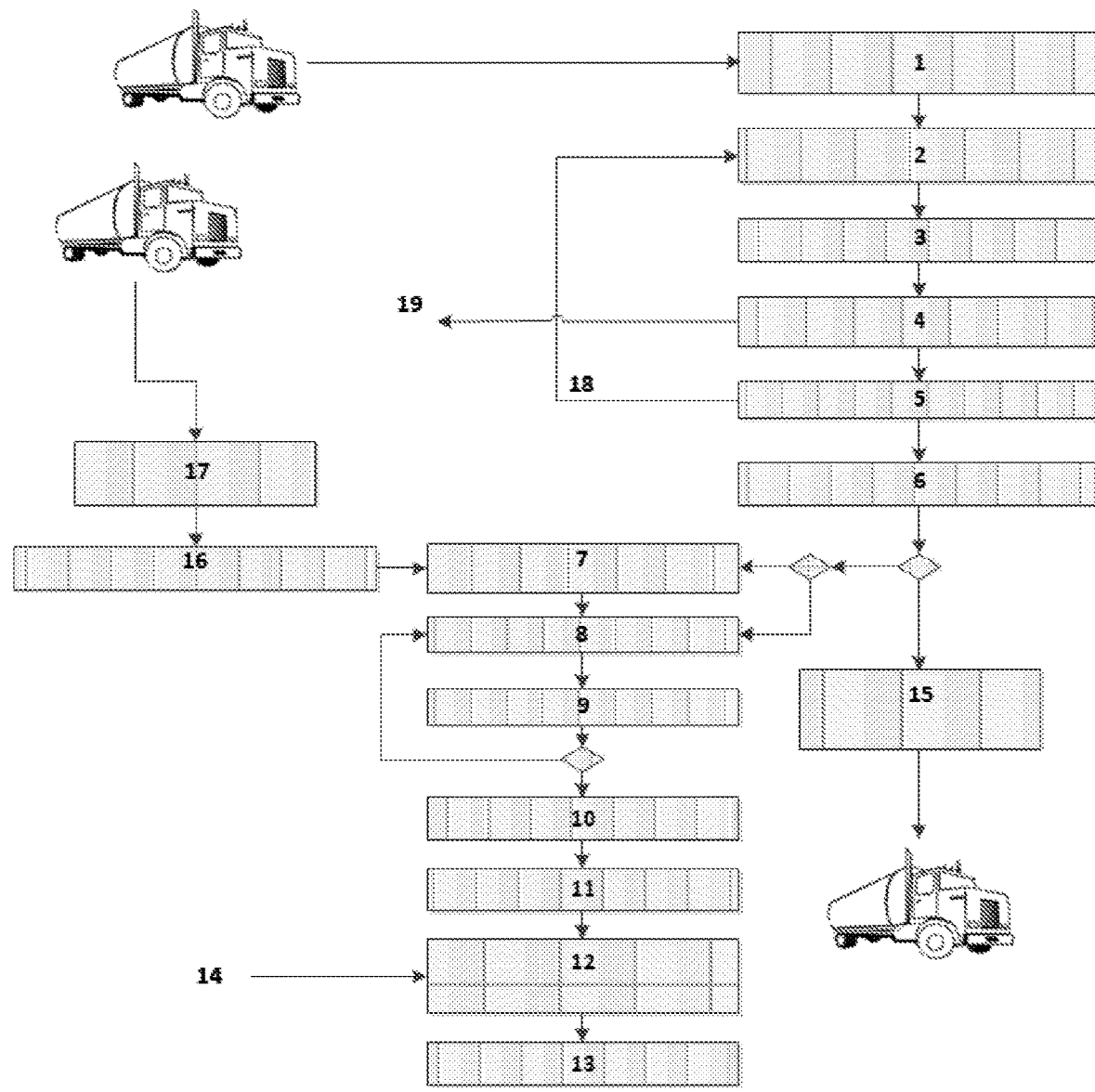

METHOD FOR PREPARATION OF A PROTEIN SUPPLEMENT FOR ANIMAL FEED

FIELD OF INVENTION

This invention is related to fish silage drying and in particular is directed to an optimized method for fish silage drying and its constituent materials, as well as products resulting from said method, more specifically it is related to the salmon silage drying and obtaining a protein supplement from it.

BACKGROUND OF THE INVENTION

Chilean salmon industry has been without a doubt one of the most relevant promises when speaking about the growth of the country. From the 90s, salmon culture massified and was transformed in a competitive industry that could participate in worldwide commerce.

Salmon culture in closed and semi controlled environments aims to generate multiple stages in which the fish is under natural conditions, and also decrease high mortality rates that they present during their natural cycle, as well as generating a homogeneous quality in the production.

In Chile, production of these animals has been developed for three species: Atlantic Salmon or Salar, Trout Salmon and Pacific Salmon or Coho. Of these, there are some that have only a single seasonal cycle. The Atlantic or Salar Salmon does not require specific seasons and therefore their culture and harvest is made whole year round and thus is the top exported species.

These backgrounds show that salmon culture is a higher profitable business and is aimed at doubling production for 2015, positioning Chile as a food power.

It is known the use of fishmeal as a protein rich source in animal diet design, nevertheless, in spite of being a complete protein source, the limited provision of fishmeal, increase in demand due to aquaculture, increase in the cost of fishmeal due to their dependency on environmental conditions, and worries about sustainability of fishing and aquaculture industries makes necessary the search of alternative protein sources from other origins.

As a viable solution confronted with the use of fishmeal, the use of a protein supplement from fish silage, results as a good alternative given its easy elaboration and low cost, and also benefits from the discard residues of fish industry, such as salmon industry.

In Chile, Salmon industry adopted silage as a universal measure for the management of organic byproducts in culture centers, as integral part of a measurements package, oriented to improve the biosanitary standards in their processes, in response to the ISA virus epidemic in 2007.

It is known in prior art the production of fish silage, offering also the possibility of using discards from the fishing and aquaculture industries in zones or regions wherein the tonnage of discard materials is insufficient to justify production of fishmeal.

The origin of fish silage starts in Sweden around 1930, and continued development in Denmark during the next years, mainly directed to formulate fattening diets for farm animals.

Silage complies with the same function as fishmeal, with the peculiarity that fish silage is a sort of pasty liquid.

Fish silage can be defined as a pasty liquid product, made from whole fish or parts or residues thereof in acid medium, as an alternative to the processing of discards from fishing plants and that can be a component in animal food rations.

There are works related to the preservation of protein matters using acid medium since 1920, in Finland. Currently, food silage is produced in countries such as Denmark, Finland, Norway, Poland, and some countries in Latin America to feed pigs, poultry, fur bearers and piliferous animals, and in aquaculture.

Currently there are various techniques to obtain fish silage, either using chemical or biological means.

Particularly, the chemical silage is elaborated by adding mineral and/or organic acids to salmon. Formic, sulfuric, hydrochloric, propionic acids or combination thereof have been used. Raw matter is ground, the acid or acids is/are added and mixed completely, for the enzymes present in the same can digest in favorable conditions in the acid medium provided. The use of formic acid is preferred, since it assures the preservation without an excessive decrease in pH, which avoids a neutralization step of the product before its use as protein supplement in animal diets.

Prior art, and according to the disclosure in Al-Marzooqui W, Al-Farsi M A, Kadim I T, Mahgoub O, Goddard J S. The effect of feeding different levels of sardine fish silage on broiler performance, meat quality and sensory characteristics under closed and open-sided housing systems. Asian-Aust J Anim Sci. 2010; 23(12): 1614-1625), discloses obtaining a product based in fish silage, which is dried, ground, packed and employed as a protein supplement in animal diets, from the raw matter of fish silage.

Prior art contains some methodologies for drying of a fish silage, and said documents are referred to the drying of a fish silage, wherein there are experiences related to acid silage rations of fish discards for poultry as described by Villela de Andrade, M. F., Lessi, E. Franqueira da Silva, J. M. 1992, and related to obtaining silage from sardine residues (*Sardinella brasiliensis*, Steindashner, 1979) and its employment in formulation of minimal cost rations for poultry. Second Expert Consult on Technologies for Fish Products in Latin America, Montevideo, Uruguay, 11 to 15 Dec. 1989. FAO Fish Report N° 441 Supplement. Rome. p. 115-125.

The research article published by Lessi, E.; Ximenes Carneiro, A. R. y Lupin, H. M. on 1992 in their work, Obtaining biological silage, presented to the Second Expert Consult on Fish Product Technology in Latin America, Montevideo, Uruguay, 11 to 15 Dec. 1989. FAO Fish Report N° 441 Supplement. Rome. p. 64-68. shows that use of sardine residues was achieved in the preserves industry of Rio de Janeiro, by preparing a chemical silage, with the aim of substituting fishmeal in the formulation at minimal cost for rations for poultry; use of the fish residues with low capital investment and low energy consumption in preparation of the silage; and offering an alternative to combat environmental pollution, in those regions wherein the volume of residues does not justify construction of fishmeal factories.

To the ground residue at pH 6.4, formic acid (85%) was added, in a ratio of 3.5%. The silage pH after preparation was 3.1 and ambient temperature 30° C. After 72 hours of hydrolysis, silage was considered complete according to pH and acidity determination.

Also, they describe that silage was dried under the sun and in the shade in different manners. After 49 hours of evaporation in the shade at ambient temperature, humidity decreased from 74.80% to 53.20%; fat increased from 5.47% to 8.93% and total protein from 15.21% to 32.76%. Also elements Ca, P. Na, K, Mg, Mn and aminoacids were determined.

Rations prepared for the same cost using linear programming were prepared, using the statistical program from IBM, MPSX1370 (Rio Data-Centro-PUC, Rio de Janeiro).

All rations for animal diet were prepared with different levels of silage and presented a lower cost than those prepared with fishmeal.

The experience concluded that the chemical composition of silage demonstrated its value as an alternative energy-protein source of high quality and, increasing its content in essential aminoacids and minerals, allowing its inclusion in low cost formulae for animal feed, in particular for poultry. The assays demonstrated the advantage of silage as a potential substitute for fishmeal in rations of animal diet. Nevertheless, this research work, in spite of achieving the exploitation of sardine residues in the preserve industry, through preparation of chemical silage, in order to substitute fishmeal, there is no method describing optimization of drying of salmon silage with concentrated acid, during the preparation of a protein-rich supplement for animal feed, incorporating the essential steps as described in the present invention.

Salmon industry worldwide produces 800 thousand tons of discards, of which 40% approximately correspond to silage (360 tons), the management of this product normally occurs as liquid, which restricts its use, as well as transport and storage, generating high costs. Some works have been published on the technical aspects of salmon silage production, but few have considered aspects related to drying the silage, and feasibility of preparing a protein-rich supplement for animal feed presenting a good nutritional quality, in relation to protein percentage, and aminoacid profile, allowing reduction of costs related to product storage, transport costs, improvement of concentrated acid salmon silage drying to avoid agglomeration of the product when located inside the drying equipment.

In general, livestock producers prefer supplementing diets with pellet or extruded concentrates, which present significant advantages in terms of manipulation and storage, compared to in situ formulations, as it has been demonstrated in works completed in Oman by Al-Marzooqui et al (2010).

The protein concentrate elaborated from salmon silage has an average of 50% of residual humidity, due to operational restrictions of process equipment. This humidity level limits inclusion of the product in pellet systems of food processing plants, related with the final humidity of the pellet and its structural integrity.

This is the reason why the attempts to introduce the protein concentrate in national market has been unsuccessful, which has motivated the development of drying technologies that can be adapted to nutritional requirements of the target species, local culture and complicate thermoplastic properties of hydrolyzed proteins that characterize concentrated acid salmon silage from the concentration step.

DESCRIPTION OF THE INVENTION

The present invention solves the technical problem of concentrated acid salmon silage drying, during preparation of a protein supplement for animal diets, through a method wherein continuously and sequentially the salmon silage is treated following the steps of cooking, solid-fluid separation, liquid-liquid separation, concentration, drying, cooling, grinding, adding antioxidants, and packing, wherein the concentration step proceeds as:

a) incorporating in a first mixer an amount of concentrated acid salmon silage, and an amount of flour-type carrier (for example wheat bran, wheat flour, rice flour, corn flour) in a ratio varying in any of the following percentages, 90% y 10%; 80% y 20%; 70% y 30%; 60% y 40% respectively.

b) incorporating in a second mixer, an amount of the mixture from the first mixer, and a fraction of the load coming out of the dryer, in a ratio that can vary between 80% y 20%; 70% y 30%; 60% y 40% respectively, the latter as a recycle;

c) transferring the mixture formed in the second mixer to a dryer;

d) recycling a fraction of the load, equivalent to an amount that can vary from 30% and 60% of the output of the second mixer, a fraction defined in function of the humidity at the exit of the dryer.

e) passing the mixture of the dry product at the exit of the dryer to a cooler, wherein the cooling of the mixture of dry product takes place.

f) feed the dry and cooled product to the steps of grinding, adding an antioxidant, and packing, to finally obtain a protein supplement for animal feed.

The advantage of using two mixers in the method of the present invention, is that it allows that the composition of the mixture is more homogeneous, and providing a better matrix for absorbing concentrated acid salmon silage, avoiding agglomeration inside the drying equipment.

In second place, the advantage of using a flour type carrier (for example wheat bran, wheat flour, rice flour, corn flour) in the present invention is that it allows absorbing the hydrolyzed fraction of salmon silage, reacting the latter with starch components present in the flour-type carrier, and optimizing the drying of salmon silage in this manner.

An additional advantage of the present invention is that the present of a cooler at the exit of the dryer, allows to decrease temperature from 80° C. to 25° C., and therefore stabilizing the product avoiding undesired oxidation.

Each one of the components of the system present in the method meets certain goals and objectives, and thus:

In the first mixer, the concentrated acid salmon silage is mixed with a flour-type carrier (for example wheat bran, wheat flour, rice flour, corn flour) in a ratio as previously described, with the purpose of obtaining a concentrated acid salmon silage matrix, and therefore facilitate drying, when a tridimensional porous structure is formed, wherein the hydrolyzate present in the salmon silage is absorbed in the fibers of the flour-type carrier.

The first mixer consists on a horizontal paddle mixer, conditioned to make a homogeneous mixture between the flour-type carrier and concentrated acid salmon silage.

The flour-type carrier for example wheat bran, wheat flour, rice flour, corn flour) is added through a dosing hopper, allowing feeding with a constant flow that can go from 70 to 300 kg/h of flour-type carrier, and controlled in the first mixer.

The second mixer is also an horizontal mixer, but with a mixer-conveyor screw design.

The dryer is a rotadisk, comprising disks with vapor chambers that indirectly heat the mass inside them, wherein the upper part is disposed an evaporated water extraction brought down by washing with cold water, wherein the dry product at the exit of the rotadisk dryer has a humidity between 8 and 11%.

The cooler allows to pass a cold air stream in crosscurrent with the dry product coming out of the dryer, and the cooler operating in such a manner that temperature descends from 80° C. to 25° C. in a time period that can vary between 10 and 30 minutes, depending on the flow of product.

The grinder used in the grinding step allows obtaining a product with a granulometry bellow 5 mm, wherein an antioxidant is added in an amount from 100 to 300 ppm, such as ethoxyquin.

The flour-type carrier, for example wheat bran, presents the features of a humidity absorbent compound, is hygroscopic, facilitating in this manner the drying of a mixture, and further incorporating to the dry salmon silage, additional nutritional conditions favoring in this manner its use as a protein supplement in animal feed.

Incorporation of a flour-type carrier further allows to improve the transport of the mixture benefiting the drying system, compared to the economy in costs of the drying process. The finished protein supplement for animal feed, has a physical form of a coarse flour, brown in color, with a characteristic odor and comprising protein in weight percentage of a minimum of 41%; fat with a maximum of 8%; humidity with a maximum of 11%; ashes with a maximum of 12%; and raw fiber with a maximum of 8%.

Storage is made in a fresh place with relative humidity below 60%, having a shelf life of 18 months, and presentation in polypropylene bags containing 25 kg, 50 kg, and maxi polypropylene bags of 1,250 kg.

However, as previously mentioned in the present invention, the mixture can be made with any type of flour, which can be wheat bran, wheat flour, rice flour, corn flour, and the drying is made in double drum type dryers.

Finally, a system is used to develop this method to improve drying of concentrated acid salmon silage, during preparation of a protein supplement for animal feed, from salmon silage, comprising a storage tank, a loading tank, a cooking equipment, a solid-liquid separation equipment, a liquid-liquid separation equipment, a concentrator equipment, a dryer, a cooler, a grinder, an antioxidant dosing equipment, and a packing equipment, wherein after the concentrator equipment is further added:
 a first mixer communicated with a flour type carrier dosing hopper and with the concentrator equipment;
 a second mixer communicated with the concentrator equipment, with the first mixer, and with the dryer, the latter in a recycling mode.

The first mixer consists in a horizontal paddle mixer, conditioned to provide a homogeneous mix between the flour-type carrier and the concentrated acid salmon silage.

The second mixer is also a horizontal mixer, but with a mixer-conveyor screw design.

The dryer is a rotadisk, comprising a disk dryer with vapor chambers providing indirect heating to the mass inside them, wherein in the upper part is disposed an evaporated water extraction, brought down by washing with cold water.

The cooler passes a cold air stream crosscurrent with the dry product coming out of the dryer, allowing a descent in the temperature from 80° C. to 25° C.

DESCRIPTION OF THE FIGURE

FIG. 1 describes steps and/or stages related to the system for reducing salmon silage, to obtain a protein supplement and 2 other subproducts: defatted and concentrated salmon silage, semi-liquid and salmon oil.

The diagram of reducing the salmon silage in FIG. 1 describes continuously and sequentially the generic steps of storage 1, loading tank (2), cooking (3), solid-liquid separation in tricanter (4), liquid-liquid separation (5), concentration in evaporation plant (6), and then continuing with drying steps (9), cooling (10), grinding (11), antioxidant dosing (12), and packing (13) of the final product represented by a protein supplement for animal feed. Also, FIG. 1 shows the following numbers corresponding to:
 (7) and (8) mixer 1 and mixer 2 respectively.
 (14) represents addition of antioxidant.
 (15) represents storage of the mixture obtained after evaporation step and before mixing step with mixers 1 and 2.
 (16) represents the hopper used to dose the flour-type carrier.
 (17) represents storage of flour-type carrier (for example wheat bran, wheat flour, rice flour, corn flour).
 (18) represents sludge obtained during the liquid-liquid separation process.
 (19) represent sediments (discards).

EXAMPLE

An example of application of the invention is described below, where the method for which protection is sought is used, without representing a limitation to the invention.

In a storage tank containing 600 tons of salmon silage, 12 tons of said silage are passed through a loading tank, maintaining constant agitation to ensure homogenization.

A certain amount of salmon silage is taken, for example a flow of 10 ton/h, and taker to a continuous cooker operating at a temperature of 95° C. leaving to react for 5 minutes, wherein an oily phase and an aqueous phase, containing the hydrolyzed product, are formed, and the non-hydrolyzed solid discards represent insoluble matter.

The treated mixture is passed to a tricanter, wherein a solid-liquid phase separation is performed, eliminating solids or insoluble matter present. Afterwards, the supernatant is introduced into a centrifuge wherein a liquid-liquid separation is performed, separating an oily and an aqueous phase; wherein the oily phase contains salmon oil, which is taken to a storage tank for future use.

Meanwhile, the aqueous phase, containing the hydrolyzed product, is introduced in an evaporator or evaporator plant, wherein water is eliminated and a wet paste of concentrated hydrolyzed product is left, representing an acid salmon silage, that has been defatted and concentrated with a percentage of water-humidity between 45% and 53%.

The concentrated acid salmon silage is introduced into a first mixer together with an amount of what bran; in a ratio of 80% and 20%, and is further incorporated in a second mixer together with a fraction of the load coming out of the dryer, the latter as a recycle, in a ratio of 80% and 20%, defined by the humidity at the exit of the dryer.

Afterwards, the mixture that has been formed in the second mixer is transported to a rotary dryer operating at a temperature between 80° C. and 95° C. during a period of 45 minutes, and a fraction of the load coming out of the dryer is recycled to the second mixer, and the mixture of dry product at the exit of the dryer is passed through a cooler, wherein the cooling of the mixture of dry product takes place at a temperature from 80° C. to 25° C. during 25 minutes.

The dry and cooled down product is fed to the grinding step wherein the product is granulated, obtaining 95% of the product with a size smaller than 5 mm, adding 200 ppm of ethoxyquine as antioxidant, and finally the protein supplement for animal feed is packed in polypropylene bags with a capacity for 50 kg.

The product before packing presents a physical form of a brown, coarse flour, with a characteristic odor.

The packed product in the corresponding bags that can go from 25 kg to 1,000 kg or more, are stored during a shelf life period of 18 months, in a fresh place with a relative humidity lower than 60%.

A representative sample of the product stored in a bag was taken, to which a physico-chemical analysis was performed, showing an nutritional evaluation of 50% protein, 7% fat, 10% humidity, 10% total ash, and 5% raw fiber.

The invention claimed is:

1. A method for preparation of a protein supplement for animal feed comprising:
   a) incorporating in a first mixer a first amount of concentrated acid salmon silage and a first amount of flour in a ratio of salmon to flour selected from the group consisting of 90:10, 80:20, 70:30 and 60:40 thereby obtaining a first homogeneous mixture;
   b) incorporating in a second mixer a second amount of concentrated acid salmon silage and a second amount of flour in a ratio of salmon to flour selected from the group consisting of 90:10, 80:20, 70:30 and 60:40, and mixing with the first homogeneous mixture obtained from the first mixer in step a) to obtain a second homogeneous mixture;
   c) transferring the second homogeneous mixture formed in the second mixer to a dryer for a drying process to obtain a dried product;
   d) recycling a portion of the dried product obtained from step c), the portion being 30% to 60% of the dried product obtained from step c), and incorporating to the second mixer in step b);
   e) passing the dried product excluding the portion of the dried product from step d), wherein the portion is 30% to 60% of the dried product, to a cooler for a cooling process, wherein the cooling is performed from 80° C. to 25° C. for 10 to 30 minutes to obtain a dry and cooled down product;
   f) feeding the dry and cooled down product to a grinder for a grinding process and adding an antioxidant to obtain a protein supplement, and packing of the protein supplement for animal feed.

2. The method according to claim 1, wherein the flour can be wheat bran, wheat flour, rice flour, or corn flour.

3. The method according to claim 2, wherein the flour is wheat bran.

4. The method according to claim 1, wherein the flour is added through a dosing hopper, allowing a constant flow feeding from 70 to 300 kg/h.

5. The method according to claim 1, wherein the drying process is carried out in a rotadisk or drum dryers.

6. The method according to claim 1, wherein the cooling comprises passing a cold air stream in crosscurrent with the dry product coming out of the dryer.

7. The method according to claim 1, wherein an antioxidant ethoxyquine is added in an amount between 100 and 300 ppm.

8. The method according to claim 1, wherein the packing comprises to fill bags with capacities of 25 kg to 1,200 kg.

* * * * *